(12) United States Patent
Hsu et al.

(10) Patent No.: US 9,239,939 B2
(45) Date of Patent: Jan. 19, 2016

(54) BASE SEAT STRUCTURE FOR SUPPORTING CHIP CARD

(75) Inventors: An Szu Hsu, New Taipei (TW); Kuo Cheng Liao, New Taipei (TW)

(73) Assignee: First Dome Corporation, New Taipei (TW)

( * ) Notice: Subject to any disclaimer, the term of this patent is extended or adjusted under 35 U.S.C. 154(b) by 706 days.

(21) Appl. No.: 13/568,440

(22) Filed: Aug. 7, 2012

(65) Prior Publication Data

US 2014/0042112 A1 Feb. 13, 2014

(51) Int. Cl.
*A47G 19/08* (2006.01)
*G06K 7/00* (2006.01)
*H04B 1/3816* (2015.01)
*G06K 13/08* (2006.01)

(52) U.S. Cl.
CPC .......... *G06K 7/0013* (2013.01); *G06K 13/0831* (2013.01); *H04B 1/3816* (2013.01)

(58) Field of Classification Search
CPC .............. H04B 1/3816; H04B 1/3818; H04M 2250/14; Y10T 29/49117; G06K 7/0013; G06K 113/0831
USPC ........................... 211/41.17; 439/159; 29/825
See application file for complete search history.

(56) References Cited

U.S. PATENT DOCUMENTS

| | | | |
|---|---|---|---|
| 7,520,766 B2 * | 4/2009 | Tsai | 439/159 |
| 7,802,727 B1 * | 9/2010 | Tsai | 235/483 |
| 8,564,965 B2 * | 10/2013 | Sloey et al. | 361/752 |
| 2009/0081890 A1 * | 3/2009 | Ogatsu | 439/64 |

* cited by examiner

*Primary Examiner* — Korie H Chan
(74) *Attorney, Agent, or Firm* — Rosenberg, Klein & Lee

(57) ABSTRACT

A base seat structure for supporting a chip card includes a tray which is utilized to configured a chip card and capable of being formed by a reciprocally-moved type, a base frame disposed on the tray, a fastening frame disposed on the tray and having a retarding portion, and a carrier which is configured between the base frame and the fastening frame and capable of being motioned between a first position and a second position to follow the reciprocally-moved tray. When the carrier is motioned toward the first position, the retarding portion of the fastening frame presses the carrier to pass through a limitation of the base frame to motion toward the second position, thereby pushing or allowing the tray for movement. Moreover, when the tray and the carrier are motioned toward the first position, the chip card is located or electronically connected.

29 Claims, 5 Drawing Sheets

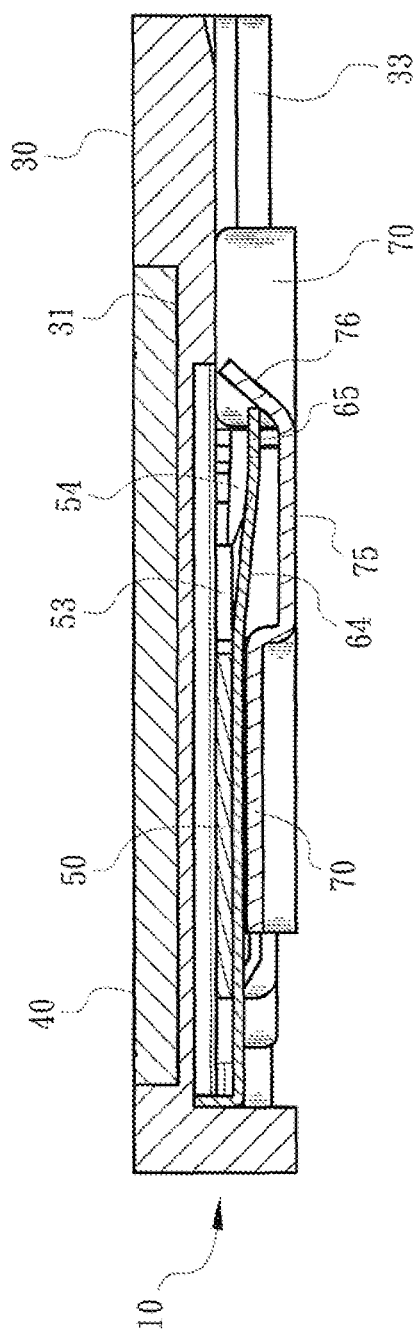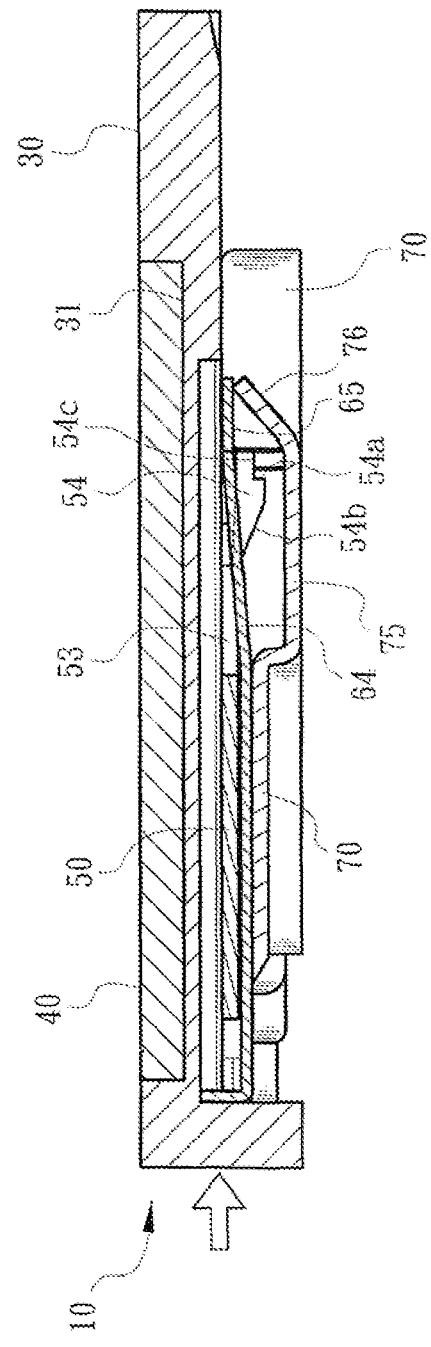

BASE SEAT STRUCTURE FOR SUPPORTING CHIP CARD

BACKGROUND OF THE INVENTION

1. Field of the Invention

The invention relates to a base seat structure for supporting a chip card or a smart car, in particular relates to an engagement of a carrier, a base frame and a retarding portion of a fastening frame applied to assist a tray utilized for loading a chip card in locating or generating movement.

2. Description of the Related Art

Applications of a substrate and an integrated circuit or a microprocessor aggregated in a center of the substrate of a chip card or a subscriber identity module (SIM) card, which are utilized to realize information transmission of communication network, are already known as conventional skills. Generally, the integrated circuit of such smart card is electronically connected to terminals of a connector or a socket when the smart card is plugged into the connector or the socket.

In conventional skills, types of smart cards capable of being manually plugged into connectors or sockets by an operator are also disclosed. Basically, in the structure design of such smart card, the smart card is limitedly pushed out of the connector or the socket from one end of the smart card by the operator, rather than allowing the operator to directly draw out the smart card in an insertion direction thereof. In otherwise structure designs, the users are allowed to manually push out a smart card from the surface thereof. Moreover, in some structure designs of conventional skills, a back cover which is additionally provided at a region parallel to a surface of a smart card is utilized to shield the smart card. That is to say, the smart card is allowed to be removed unless the back cover is opened by the operator.

In conventional skills, a structure of a drawer-type connector or socket assembled with a smart card is disclosed. Such drawer-type connector or socket structure is generally configured with a drawer-type machine frame and a tray, in which the machine frame has two sides formed with sliding slots, and the tray has lateral sides correspondingly engaged to the sliding slots of the machine frame, such that the tray can be plugged in an interior of the machine frame to form an assembly structure.

One topic related to structure designs and applications of such assembly of the smart card and the socket or connector shall be concerned is that the assembly of the machine-frame sliding slots and the tray lateral sides has an inferior stability, and the condition of the machine-frame sliding slots tended to be worn by the tray lateral sides in a normal use generally causes unsmoothness of push-assembling or drawing movement cooperatively executed by the tray and the machine frame, and certainly these conditions are not our expectations.

Representatively speaking, these reference data reveal the conditions of usage and structural design of the smart card and the connector (the socket) or combination components connected therewith. If the structure and above-described applications of the connector or the socket and the components connected therewith (e.g., the machine frame, the tray, etc.) can be properly redesigned and reconsidered, the use pattern and the application conditions of the connector or the socket and the components connected therewith can be advancedly altered, thus to be distinguished from conventional products and methods. For example, the following topics to the structure design of the connector or the socket and the components connected therewith at least shall be considered.

Firstly, the structure design of the connector or the socket shall provide the operator with direct push-press, push-away or automatic eject-away functions so that the chip card or the smart card can be conveniently removed or placed by the operator, thereby improving complicated operation in conventional skills and providing a use with a simple and convenient operation.

Secondly, the improper conditions in conventional skills shall be simultaneously improved, such as an inferior stability of the assembly of the machine-frame sliding slots and the tray lateral sides, and the machine-frame sliding slots tended to be worn by the tray lateral sides in a normal use to cause unsmoothness of push-assembling or drawing movement cooperatively executed by the tray and the machine frame.

BRIEF SUMMARY OF THE INVENTION

In view of this, the main purpose of the invention is to provide a base seat structure for supporting a chip card which is capable of providing a simple and convenient operation. The base seat structure includes a tray which is utilized to configured a chip card and capable of being formed by a reciprocally-moved type, a base frame disposed on the tray, a fastening frame disposed on the tray and having a retarding portion, and a carrier which is configured between the base frame and the fastening frame and capable of being motioned between a first position and as second position to follow the reciprocally-moved tray. When the carrier is motioned toward the first position, the retarding portion of the fastening frame presses the carrier to pass through a limitation of the base frame to motion toward the second position, thereby pushing or allowing the tray for movement. Moreover, when the tray and the carrier are motioned toward the first position, the chip card is located or electronically connected.

According to the base seat structure for supporting the chip card of the invention, an elastic device is configured between the base frame and the carrier. The elastic device stores energy therein when an operator pushes the tray to drive the carrier to move toward the first position. The elastic device releases the stored energy therefrom to drive the carrier to push or eject away the tray when the carrier leaves a limitation of the base frame.

According to the base seat structure for supporting the chip card of the invention, the base frame comprises a limiting portion which does not motion toward the second position. Only if the operator pushes the tray to drive the carrier to motion toward the first position so as to leave the limiting portion of the base frame, the carrier can be passed through the limiting portion of the base frame to push the tray for movement or opening until the retarding portion of the fastening frame presses the carrier.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4 is a sectional schematic view of a structure of the invention, showing a condition of a carrier situated in an initial position and a configuration of a tray, a base frame and a fastening frame;

FIG. 5 is a schematic view of an operational embodiment of the invention, showing a condition of a carrier being motioned toward a first position to pass over a limiting portion together with an extended portion;

DETAILED DESCRIPTION OF THE INVENTION

Figure 1:
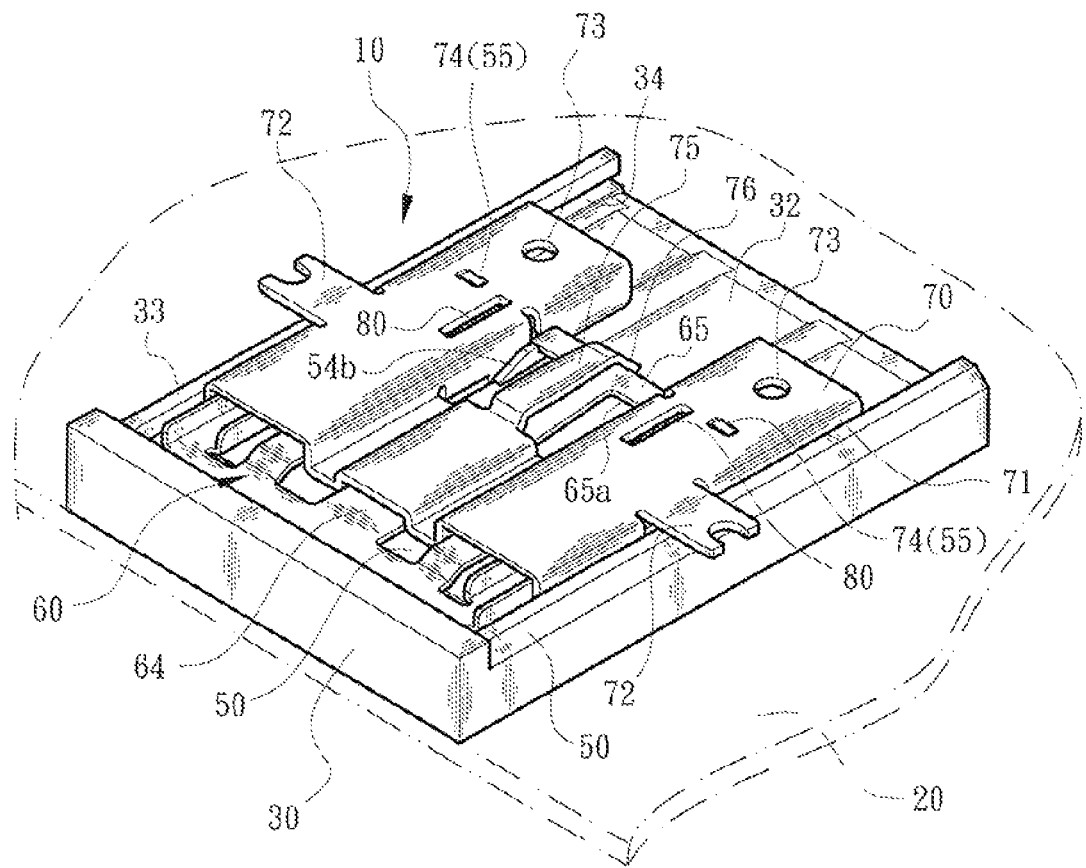
FIG. 1 is an assembled schematic view of a structure of an embodiment of the invention.
Figure 2:
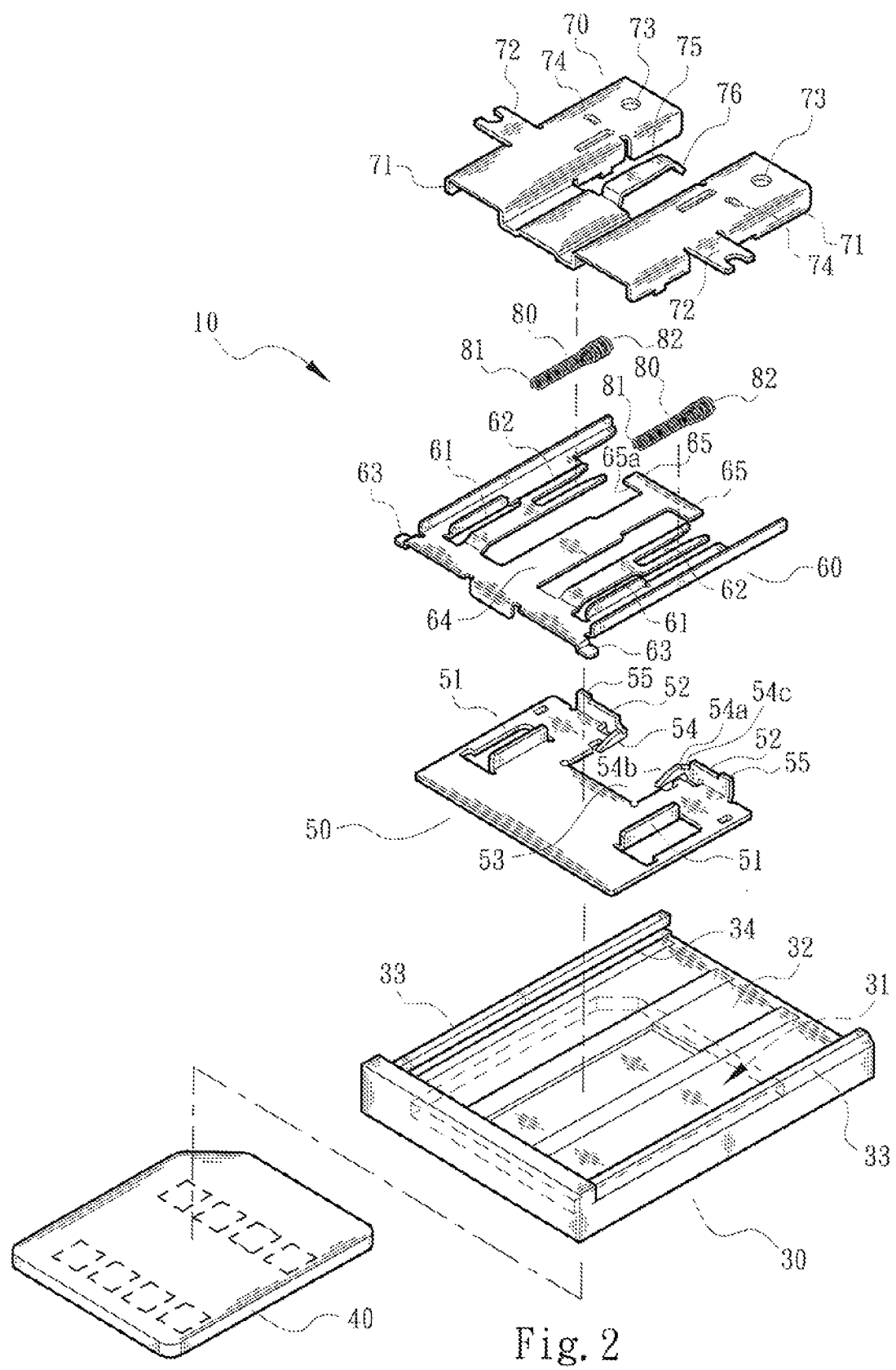
FIG. 2 is an exploded schematic view of the structure of FIG. 1, showing a relation of a tray, a base frame, a carrier and a fastening frame.
Figure 3:
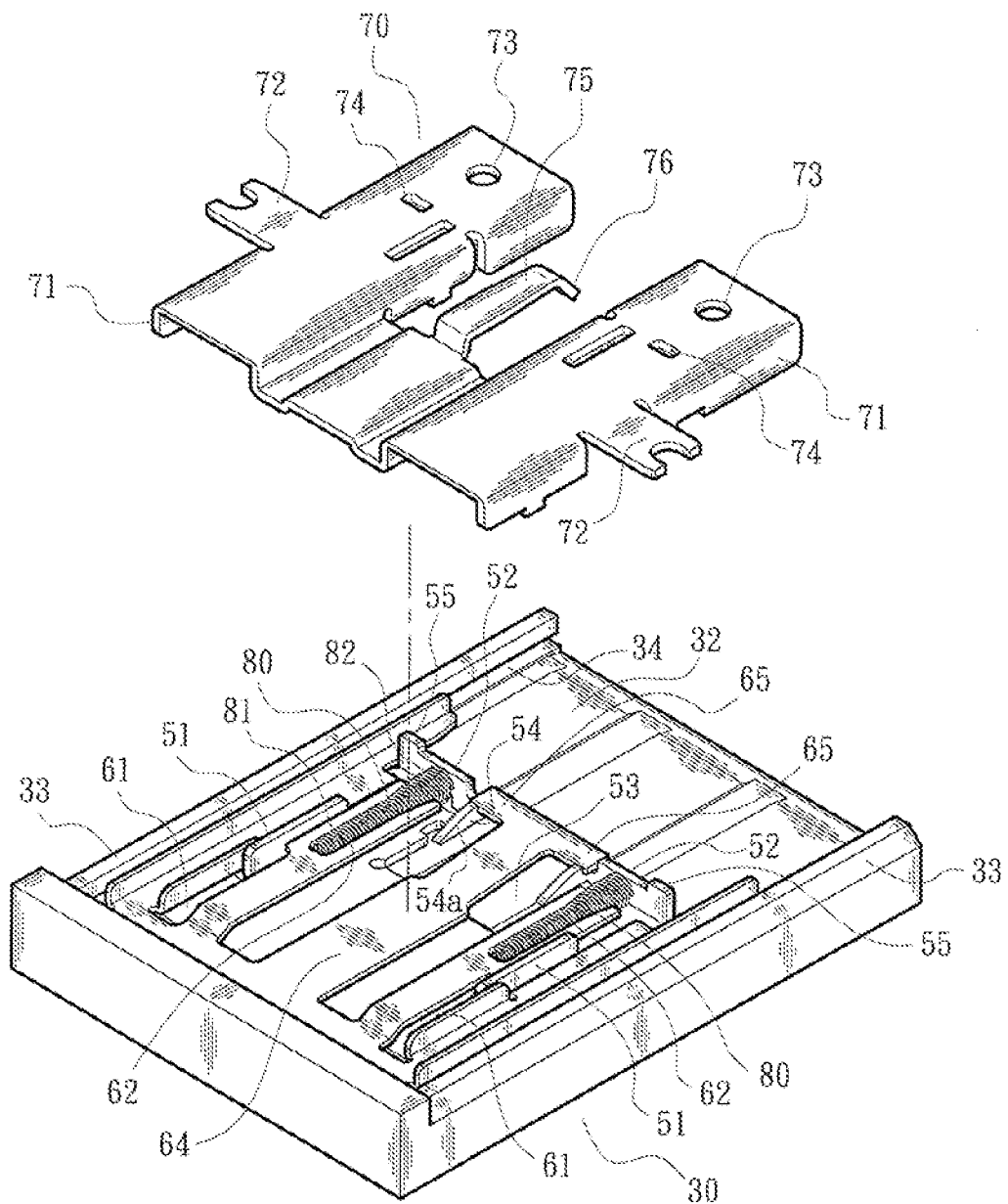
FIG. 3 is an assembled schematic view of a partial structure of the invention, showing a configuration of an elastic device, a base frame and a carrier.

Referring to FIGS. 1, 2 and 3, the invention provides a base seat structure for supporting a chip card. The base seat structure is a combination of a base seat and an electronic apparatus, generally denoted by reference numbers 10 and 20. The electronic apparatus 20 is selected from a computer facility, a digital communication machine or a mobile communication terminal (e.g., a mobile phone). In the adopted embodiment, the base seat 10 comprises a tray 30 which is utilized to configure or install a chip card 40 and capable of being reciprocally moved. FIGS. 1, 2 and 3 depict a back region of the base seat 10 or the tray 30. That is to say, a concave chamber 31 (a portion shown by a dotted line in FIG. 2) formed on as front region of the tray 30 is utilized to install the chip card 40. In this explanatory embodiment, the chip card 40 is selected from a SIM (subscriber identity module) card or a smart card.

In particular, FIG. 2 depicts that the back region of the tray 30 is provided with a slot chamber 32 which is utilized to receive a base frame 50, a fastening frame 70, and a carrier 60 configured between the base frame 50 and the fastening frame 70. The slot chamber 32 of the tray 30 comprises two side walls 33 and rails 34 formed on the side walls 33. Concretely speaking, the base frame 50 formed by type of a laminate article is disposed at a position in the slot chamber 32 of the tray 30 (or to be close to a bottom portion of the slot chamber 32 of the tray 30). The base frame 50 further comprises at least one ridge portion 51 and a side plate 52. The carrier 60 corresponding to the ridge portion 51 of the base frame 50 is formed by type of a sheet body having a slit 61. The slit 61 of the carrier 60 is utilized to receive the ridge portion 51 formed on the base frame 50, and the slit 61 of the carrier 60 has a length greater than that of the ridge portion 51 of the base frame 50, so that the ridge portion 51 of the base frame 50 is allowed to move in the slit 61 of the carrier 60.

FIG. 2 also depicts that the base frame 50 further comprises a notch 53 and a limiting portion 54, in which the notch 53 is formed at a region or position between two ridge portions 51, and the limiting portion 54 formed by type of a protrusion comprises a shoulder portion 54a, a slanted side 54b connected to the shoulder portion 54a, and a base portion 54c connected to the shoulder portion 54a. In a preferred embodiment, the carrier 60 is disposed with at least one pocket 62 assembled with an elastic device 80. Specifically, the elastic device 80 configured between the base frame 50 and the carrier 60 comprises two ends respectively abutted in the pocket 62 of the carrier 60 and on the side plate 52 of the base frame 50, as the condition shown in FIG. 3.

In an executable embodiment, the carrier 60 comprises two side regions and a protruded toe portion 63 formed on the two side regions, in which the toe portion 63 is installed inside a rail 34 of the tray 30, so that the carrier 60 is capable of being motioned between a first position and a second position.

FIGS. 2 and 3 also depict that the carrier 60 comprises a cantilevered arm 64 and an extended portion 65 connected to a distal end of the cantilevered arm 64, in which the extended portion 65 is provided with one side 65a. That is to say, FIG. 3 depicts an initial position of the carrier 60, and the extended portion 65 (or the side 65a) is leaned against the shoulder portion 54a and the base portion 54c) of the limiting portion 54 of the base frame 50. Therefore, in the adopted embodiment, the first position is referred to a position of the carrier 60 when the extended portion 65 of the carrier 60 is moved in a direction of leaving the shoulder portion 54a of the base frame 50, and the second position is referred to a position of the carrier 60 when the extended portion 65 of the carrier 60 oppositely passes through the limiting portion 54 of the base frame 50 and pushes away the tray 30.

Still referring to FIGS. 1, 2 and 3, the fastening frame 70 is also formed by type of a laminate article. The fastening frame 70 comprises two lateral walls 71 received between the side walls 33 of the tray 30. In the adopted embodiment, the two lateral walls 71 of the fastening frame 70 are protruded with ear portions 72, and the fastening frame 70 is provided with a post aperture 73 capable of enabling the fastening frame 70 to be fixed on the electronic apparatus 20. The fastening frame 70 is also provided with a hole 74 utilized to combine or receive a convex portion 55 formed on the base frame 50. Therefore, the fastening frame 70 and the base frame 50 are formed by a fixation type, and the tray 30 and the carrier 60 are formed by a reciprocally-moved type.

These figures also depict that the fastening frame 70 further comprises a retarding portion 75, in which the retarding portion 75 comprises a tail end 76 formed by a type of bending toward the below on the drawing, or the tail end 76 of the retarding portion 75 of the fastening frame 70 is formed by a upwardly-bent type in FIGS. 4~7. Therefore, when the carrier 60 is in the initial position, the extended portion 65 of the carrier 60 is situated in a region or range of the retarding portion 75 (or the tail end 76) of the fastening frame 70.

Referring to FIGS. 4 and 5, FIG. 4 depicts that the carrier 60 situated in the initial position, the chip card 40 is electronically connected to the electronic apparatus 20, and the extended portion 65 of the carrier 60 is leaned against the shoulder portion 54a (and the base portion 54c) of the base frame 50 to from a locating type. When an operator pushes and presses the tray 30 to drive the carrier 60 to move from the initial position toward the first position, the extended portion 65 (and the side 65a thereof) of the carrier 60 leaves the shoulder portion 54a (and the base portion 54c) of the base frame 50 to approach the tail end 76 of the retarding portion 75 of the fastening frame 70, and the pocket 62 of the carrier 60 and the side plate 52 of the base frame 50 are driven to compressively assemble with the elastic device 80 for storing energy. When the extended portion 65 of the carrier 60 reaches the tail end 76 of the retarding portion 75 of the fastening frame 70 (or at least the side 65a of the extended portion 65 of the carrier 60 leaves the base portion 54c of the base frame 50), the tail end 76 of the retarding portion 75 of the fastening frame 70 drives the extended portion 65 of the carrier 60 to press above the limiting portion 54 of the base frame 50, as the condition shown in FIG. 5.

Figure 6:
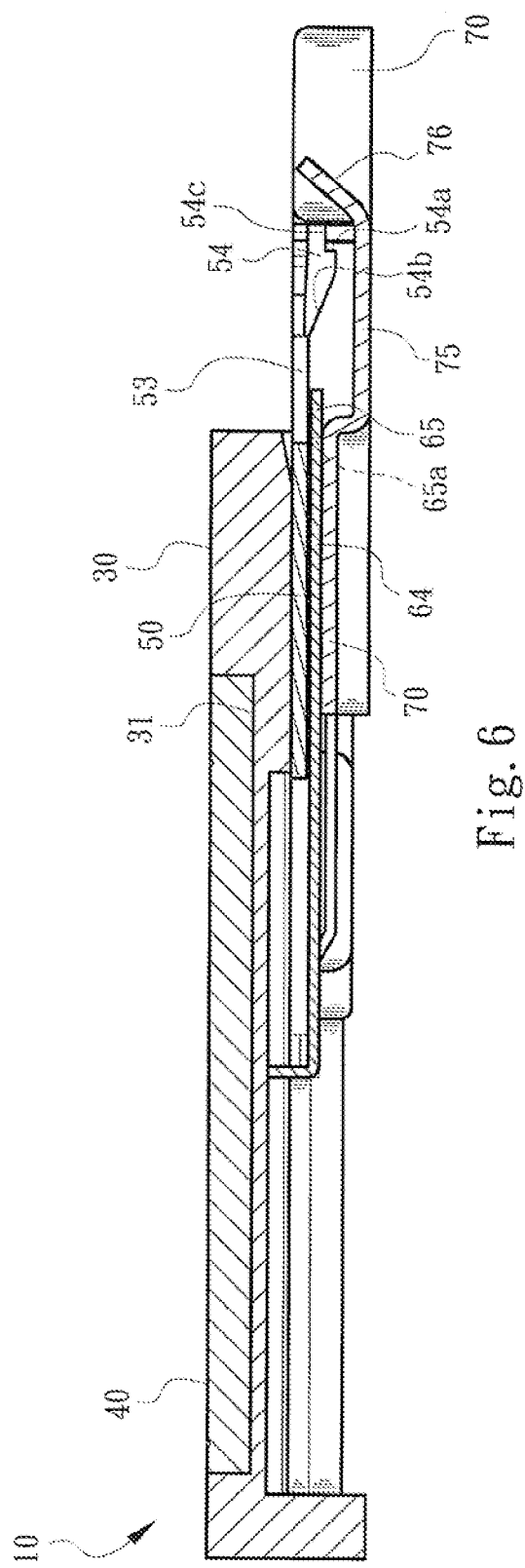
FIG. 6 is a schematic view of another operational embodiment of the invention, showing a condition of a carrier being motioned toward a second position to push away a tray.

Referring again to FIG. 5, presumed that the operator's force applied to push and press the tray 30 is released, in cooperation with the stored energy released from the elastic device 80, the extended portion 65 of the carrier 60 passes through the limiting portion 54 of the base frame 50 from between the base frame 50 and the tray 30, so that the carrier 60 is motioned toward the second position to drive the carrier 60 to push away the tray 30 or to eject away the tray 30 at about 5.2 mm, as the condition shown in FIG. 6. When the tray 30 is automatically pushed away or ejected away by the carrier 60, the operator is allowed to pull away the tray 30 at about 17 mm, so that the chip card 40 can be conveniently removed from or installed on the tray 30 by the operator.

Figure 7:
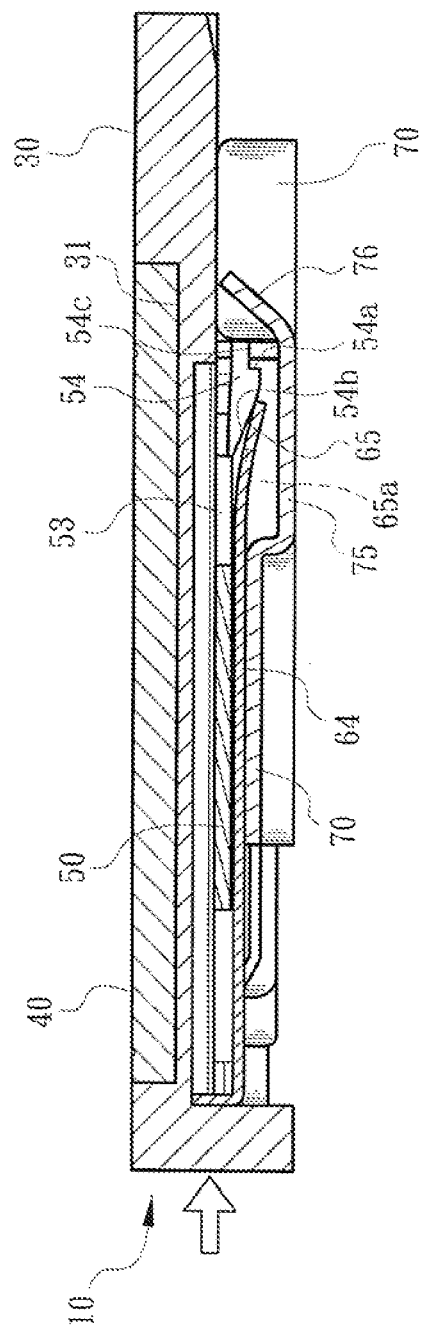
FIG. 7 is a schematic view of another operational embodiment of the invention, showing a condition of as tray operated to drive a carrier to motion toward an initial position.

Referring to FIGS. 6 and 7, when the tray 30 is movably pushed by the operator, the tray 30 drives the carrier 60 (and the cantilevered arm 64 and the extended portion 65 thereof) to move toward the initial position (or the first position). Particularly, FIG. 7 depicts that the extended portion 65 of the carrier 60 is motioned along the slanted side 54b of the limiting portion 54 of the base frame 50, and the tray 30 and the carrier 60 again return to the initial locating position to cause the chip card 40 and the electronic apparatus 20 to form as an electronically-connected type, until the extended portion 65 of the carrier 60 crosses over the shoulder portion 54a of the limiting portion 54 of the base frame 50, as the condition shown in FIG. 4.

It will be understood that the notch 53 of the base frame 50 is capable of providing a movement space to the extended portion 65 of the carrier 60.

Representatively speaking, the base seat structure for supporting the chip card of the invention provides the considerations and advantages as follows, compared with conventional skills.

Firstly, the structure and operational utilizations of the tray 30, the base frame 50, the carrier 60, the fastening frame 70 and components connected therewith have been redesigned and reconsidered, providing aspects distinguished from conventional skills. For example, with the structure designs of the base frame 50 provided with the limiting portion 54; the cantilevered arm 64 and the extended portion 65 of the carrier 60 utilized to assemble with the elastic device 80, and the retarding portion 75 of the fastening frame 70 for engagement, the carrier 60 is provided with functions of automatically pushing away or ejecting away the tray 30 and the chip card 40.

Secondly, with the structure design of the base seat 10 allowing the operator to conveniently remove or place the chip card 40 by way of direct push-press, push-away or automatic eject-away functions, the invention can provide a user with a simple and convenient operation, thus to improve complicated operation in conventional skills.

Thirdly, with the structure design of the tray 30 provided with the side walls 33 and the rails 34 to engage the toe portion 63 of the carrier 60 and the lateral walls 71 of the fastening frame 70, or with the structure design of the tray 30 provided with the slot chamber 32 to assemble the base frame 50, the carrier 60 and the fastening frame 70, the invention can greatly improve the improper conditions in conventional skills, such as an inferior stability of the assembly of the machine-frame sliding slots and the tray lateral sides, and the machine-frame sliding slots tended to be worn by the tray lateral sides in a normal use to cause unsmoothness of push-assembling or drawing movement cooperatively executed by the tray and the machine frame.

Accordingly, the invention effectively provides a base seat structure for supporting a chip card featuring of a unique spatial pattern and incomparable advantages and inventiveness, superior to conventional skills.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A base seat structure for supporting a chip card, comprising:
   a tray capable of being reciprocally moved;
   a base frame disposed on the tray and comprising a limiting portion;
   a fastening frame disposed on the tray and comprising a retarding portion; and
   a carrier configured between the base frame and the fastening frame, capable of being motioned between a first position and a second position to follow the reciprocally-moved tray, the tray being provided with a slot chamber utilized to receive the base frame, the fastening frame and the carrier.

2. The base seat structure for supporting the chip card as claimed in claim 1, wherein the tray is formed with a concave chamber.

3. The base seat structure for supporting the chip card as claimed in claim 2, wherein the concave chamber formed on a front region of the tray is utilized to install a chip card.

4. The base seat structure for supporting the chip card as claimed in claim 1, wherein the slot chamber is formed on a back region of the tray.

5. The base seat structure for supporting the chip card as claimed in claim 1, wherein the slot chamber of the tray comprises two side walls and rails formed on the side walls.

6. The base seat structure for supporting the chip card as claimed in claim 1, wherein the base frame formed by type of a laminate article is disposed at a position to be close to a bottom portion of the slot chamber of the tray.

7. The base seat structure for supporting the chip card as claimed in claim 1, wherein the base frame further comprises at least one ridge portion and a side plate.

8. The base seat structure for supporting the chip card as claimed in claim 1, wherein the carrier formed by type of a sheet body comprises a slit.

9. The base seat structure for supporting the chip card as claimed in claim 1, wherein the base frame includes a ridge portion and the carrier includes a slit utilized to receive the ridge portion of the base frame.

10. The base seat structure for supporting the chip card as claimed in claim 9, wherein the slit of the carrier has a length greater than that of the ridge portion of the base frame, so that the ridge portion of the base frame is allowed to move in the slit of the carrier.

11. The base seat structure for supporting the chip card as claimed in claim 1, wherein the base frame further comprises a notch.

12. The base seat structure for supporting the chip card as claimed in claim 7, wherein the base frame includes two ridge portions and a notch formed at a region between the two ridge portions.

13. The base seat structure for supporting the chip card as claimed in claim 1, wherein the limiting portion of the base frame comprises a shoulder portion, a slanted side connected to the shoulder portion, and a base portion connected to the shoulder portion.

14. The base seat structure for supporting the chip card as claimed in claim 1, wherein the limiting portion of the base frame is formed by type of a protrusion.

15. A base seat structure for supporting the chip card, comprising:

a tray capable of being reciprocally moved;

a base frame disposed on the tray and comprising a limiting portion;

a fastening frame disposed on the tray and comprising a retarding portion;

a carrier configured between the base frame and the fastening frame, capable of being motioned between a first position and a second position to follow the reciprocally-moved tray; and an elastic device is configured between the base frame and the carrier.

16. The base seat structure for supporting the chip card as claimed in claim 1, wherein the carrier is disposed with at least one pocket assembled with an elastic device.

17. The base seat structure for supporting the chip card as claimed in claim 16, wherein the elastic device comprises two ends respectively abutted in the pocket of the carrier and on a side plate of the base frame.

18. The base seat structure for supporting the chip card as claimed in claim 1, wherein the carrier comprises two side regions and a protruded toe portion formed on the two side regions.

19. The base seat structure for supporting the chip card as claimed in claim 18, wherein the toe portion of the carrier is installed inside a rail formed on the tray.

20. A base seat structure for supporting the chip card, comprising:

a tray capable of being reciprocally moved;

a base frame disposed on the tray and comprising a limiting portion;

a fastening frame disposed on the tray and comprising a retarding portion;

a carrier configured between the base frame and the fastening frame, capable of being motioned between a first position and a second position to follow the reciprocally-moved tray, the carrier including a cantilevered arm and an extended portion connected to a distal end of the cantilevered arm and being provided with one side.

21. The base seat structure for supporting the chip card as claimed in claim 13, wherein the carrier comprises a cantilevered arm and an extended portion connected to a distal end of the cantilevered arm and provided with one side, and the extended portion of the carrier is leaned against the shoulder portion and the base portion of the limiting portion of the base frame.

22. The base seat structure for supporting the chip card as claimed in claim 1, wherein the fastening frame formed by type of a laminate article comprises two lateral walls and the tray comprises two side walls, in which the two lateral walls of the fastening frame are received between the side walls of the tray.

23. The base seat structure for supporting the chip card as claimed in claim 22, wherein the two lateral walls of the fastening frame are protruded with ear portions, enabling the fastening frame to be fixed on an electronic apparatus.

24. The base seat structure for supporting the chip card as claimed in claim 1, wherein the fastening frame is provided with a post aperture, enabling the fastening frame to be fixed on an electronic apparatus.

25. The base seat structure for supporting the chip card as claimed in claim 1, wherein the base frame includes a convex portion formed thereon and the fastening frame is provided with a hole utilized to receive the convex portion of the base frame for affixing the fastening frame to the base frame.

26. The base seat structure for supporting the chip card as claimed in claim 1, wherein the retarding portion of the fastening frame comprises a tail end.

27. The base seat structure for supporting the chip card as claimed in claim 26, wherein the tail end of the retarding portion of the fastening frame is angularly directed with respect to a remaining portion of the retarding portion.

28. The base seat structure for supporting the chip card as claimed in claim 20, wherein the extended portion of the carrier passes through the limiting portion in between the base frame and the tray when the carrier is motioned from the first position toward the second position.

29. The base seat structure for supporting the chip card as claimed in claim 20, wherein the limiting portion of the base frame comprises a shoulder portion and a slanted side, and the extended portion of the carrier crossing over the shoulder portion of the limiting portion of the base frame along the slanted side of the limiting portion of the base frame is to be located when the carrier is motioned from the second position toward the first position.

* * * * *